US008842615B1

(12) United States Patent
Kalbag et al.

(10) Patent No.: US 8,842,615 B1
(45) Date of Patent: Sep. 23, 2014

(54) AUTONOMOUS ACTUATION OF WI-FI RADIO BASED ON CELLULAR NETWORK LOAD

(75) Inventors: Rohit Kalbag, Bridgewater, NJ (US); Fangqiu Tu, Caldwell, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 660 days.

(21) Appl. No.: 13/070,989

(22) Filed: Mar. 24, 2011

(51) Int. Cl.
*H04W 4/00* (2009.01)
*H04W 72/04* (2009.01)
*H04W 88/06* (2009.01)

(52) U.S. Cl.
CPC .......... *H04W 72/0486* (2013.01); *H04W 88/06* (2013.01); *H04W 72/048* (2013.01)
USPC ............ 370/329; 370/338; 370/341; 370/348

(58) Field of Classification Search
CPC ................................................ H04W 72/0486
USPC ......... 370/254, 311, 312, 331, 329, 338, 341, 370/348; 455/456.6, 522, 552
See application file for complete search history.

(56) References Cited

U.S. PATENT DOCUMENTS

| 6,456,858 | B1* | 9/2002 | Streter ....................... 455/552.1 |
|---|---|---|---|
| 2007/0135154 | A1* | 6/2007 | Gautier et al. ................ 455/522 |
| 2008/0025239 | A1* | 1/2008 | Bossoli et al. ................ 370/312 |
| 2008/0049675 | A1* | 2/2008 | Burgan et al. ................. 370/331 |
| 2011/0075589 | A1* | 3/2011 | Bradley et al. ................ 370/254 |
| 2011/0188425 | A1* | 8/2011 | Rydnell et al. ................ 370/311 |
| 2012/0052883 | A1* | 3/2012 | Austin et al. ............... 455/456.6 |
| 2012/0127955 | A1* | 5/2012 | Gandham et al. ............ 370/331 |

* cited by examiner

*Primary Examiner* — Brian D Nguyen
*Assistant Examiner* — Toan Nguyen

(57) ABSTRACT

A wireless mobile communication device may include a first and second transceiver, a network load detection system, and a second transceiver controller. The first transceiver may be configured to wirelessly communicate with a first wireless communication network, such as a wireless cellular communication network. The second transceiver may be different from the first transceiver and may be configured to wirelessly communicate with a second wireless communication network which may be different from the first wireless communication network, such as the Internet and at least one Wi-Fi access point. The network load detection system may be configured to detect load information indicative of an amount of load on the first wireless communication network. The second transceiver controller may be configured to autonomously power on the second transceiver when the load information indicates a heavy load on the first wireless communication network.

21 Claims, 3 Drawing Sheets

AUTONOMOUS ACTUATION OF WI-FI RADIO BASED ON CELLULAR NETWORK LOAD

BACKGROUND

1. Technical Field

This disclosure relates to wireless mobile communication devices, cellular communication networks, and Wi-Fi access points.

2. Description of Related Art

Cellular communication networks may handle voice and data communications with wireless mobile communication devices, such as cell phones, PDAs, and laptop computers. Wi-Fi access points may provide these devices with wireless access to the Internet.

Some wireless mobile communication devices may provide connectivity to both a cellular communication network and Wi-Fi access points. The user may be permitted to select which communication network to use.

Using Wi-Fi may provide greater bandwidth for the user and may help cellular communication networks by offloading high volume data transfers from them. However, a Wi-Fi transceiver may add significantly to battery drain. Users may therefore keep their Wi-Fi transceivers off to save power. Users may also not be aware that a Wi-Fi connection can improve performance, especially when the cellular communication network is overloaded. The failure of uses to power on their Wi-Fi transceivers may therefore deprive both users and cellular communication networks with potential benefits.

SUMMARY

A wireless mobile communication device may include a first and second transceiver, a network load detection system, and a second transceiver controller. The first transceiver may be configured to wirelessly communicate with a first wireless communication network. The second transceiver may be different from the first transceiver and may be configured to wirelessly communicate with a second wireless communication network which may be different from the first wireless communication network. The network load detection system may be configured to detect load information indicative of an amount of load on the first wireless communication network. The second transceiver controller may be configured to autonomously power on the second transceiver when the load information indicates a heavy load on the first wireless communication network.

The first wireless communication network may be a wireless cellular communication network which includes a plurality of wireless communication network sites. The first transceiver may be configured to wirelessly communicate with one of the wireless communication network sites. The network load detection system may be configured to detect load information indicative of an amount of load on the one wireless communication network site. The second transceiver controller may be configured to autonomously power on the second transceiver when the load information indicates a heavy load on the one wireless communication site.

The second wireless communication network may provide access to the Internet via a Wi-Fi access point. The second transceiver may be a Wi-Fi transceiver configured to wirelessly communicate with the Wi-Fi access point.

The load information which is detected by the network load detection system may include a signal from the first wireless communication network directing the first transceiver to change to a slower speed communication channel or switch over to an alternate lower bandwidth technology and wireless network that the first transceiver also supports. The second transceiver controller may be configured to autonomously power on the second transceiver in response to receipt of the signal from the first wireless communication network directing the first transceiver to change to a slower speed communication channel or switch over to an alternate lower bandwidth technology and wireless network that the first transceiver also supports.

The load information which is detected by the network load detection system may include a signal from the first wireless communication network directing the first transceiver to change a power of signal transmission. The second transceiver controller may be configured to autonomously power on the second transceiver in response to receipt of the signal from the first wireless communication network directing the first transceiver to change a power of its signal transmission.

The load information which is detected by the network load detection system may include a signal from the first wireless communication network directing the first transceiver to change a rate of data transmission. The second transceiver controller may be configured to autonomously power on the second transceiver in response to receipt of the signal from the first wireless communication network directing the first transceiver to lower the rate of data transmission.

The load information which is detected by the network load detection system may include information indicative of a signal-to-noise ratio of a signal being received by the first transceiver from the first wireless communication network. The second transceiver controller may be configured to autonomously power on the second transceiver in response to the signal-to-noise ratio not meeting a threshold.

The load information which is detected by the network load detection system may include an alternate transceiver activation signal on a channel in the first wireless communication network which is dedicated to the delivery of this signal when the load on the first wireless communication network becomes heavy. The second transceiver controller may be configured to autonomously power on the second transceiver in response to receipt of the alternate transceiver activation signal from the first wireless communication network.

The second transceiver controller may be configured to autonomously power down the second transceiver when the load information no longer indicates a heavy load on the first wireless communication network.

The wireless mobile communication device may include a battery configured to power the wireless mobile communication device. The second transceiver controller may be configured to autonomously power down the second transceiver when the charge remaining in the battery reaches a threshold.

Non-transitory, tangible, computer-readable media may contain computer programming instructions which are configured to cause a wireless mobile communication device of any of the types discussed above to perform any of the functions discussed above.

A wireless cellular communication network may include a plurality of wireless communication network sites. Each site may be configured to wirelessly communicate with a plurality of wireless mobile communication devices. Each site may be configured to broadcast to each of the wireless mobile communication devices a Wi-Fi activation signal. The signal may be broadcast on a common channel dedicated to the delivery of this signal. The signal may direct each of the wireless mobile communication devices to autonomously power on their Wi-Fi transceivers when the load on the wireless communication network site becomes heavy. Each site may be configured to broadcast to each of the wireless mobile communication devices a Wi-Fi deactivation signal on the same dedicated channel. The deactivation signal may direct each of the wireless mobile communication devices to autonomously power-off their Wi-Fi transceivers when the load on the wireless communication network site is no longer heavy.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
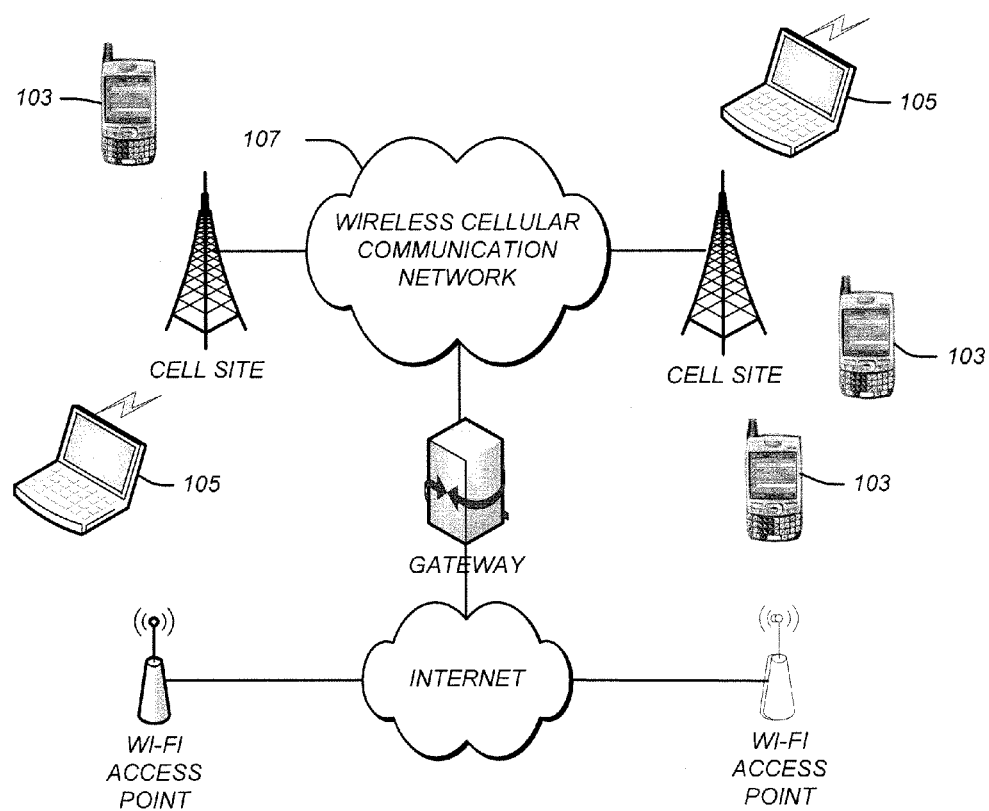
FIG. 1 illustrates an example of multiple wireless communication networks and related devices.

FIG. 1 illustrates an example of multiple wireless communication networks and related devices. As illustrated in FIG. 1, one of the communication networks may include a wireless cellular communication network 101. Another communication network may include the Internet 103. Other types of communication networks may in addition or instead be present.

A multiplicity of cell sites, such as cell sites 104 and 105, may be part of the wireless cellular communication network 101. Each cell site may provide local, wireless communication with a multiplicity of wireless mobile communication devices that are in the vicinity of the cell site. For example, a cell phone 107 and laptop computer 109 may be in the vicinity of the cell site 104, while a laptop computer 111 and cell phones 113 and 115 may be in the vicinity of the cell site 105.

One or more of the wireless mobile communication devices may have the capability of also communicating over the Internet 103 when in close proximity to a Wi-Fi access point, such as a Wi-Fi access point 117 or a Wi-Fi access point 119. Each Wi-Fi access point may be part of the other wireless communication network which includes the Internet 103. Communication between the wireless cellular communication network 101 and the Internet 103 may be facilitated by a gateway 121.

The actual topology of the multiple wireless communication networks may be different from what is illustrated in FIG. 1. For example, each cell site may serve a far greater number of wireless mobile communication devices.

Figure 2:
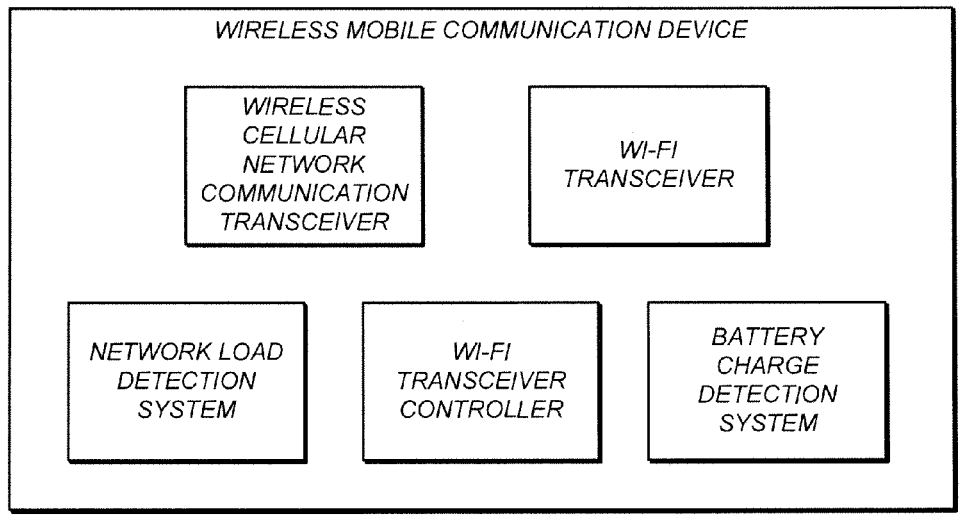
FIG. 2 illustrates an example of one of the wireless mobile communication devices illustrated in FIG. 1.

FIG. 2 illustrates an example of one of the wireless mobile communication devices illustrated in FIG. 1, such as the cell phone 107. The wireless mobile communication device illustrated in FIG. 2 may be used in connection with wireless communication networks which are different from the one illustrated in FIG. 1. Similarly, the wireless communication networks which are illustrated in FIG. 1 may be used in connection with wireless mobile communication devices which are different from the one illustrated in FIG. 2.

As illustrated in FIG. 2, the wireless mobile communication device 107 may include a wireless cellular communication network transceiver 201, a Wi-Fi transceiver 203, a network load detection system 205, a Wi-Fi transceiver controller 207, and a battery charge detection system 209.

The wireless cellular communication network transceiver 201 may be configured to wirelessly communicate with the wireless cellular communication network 101. More specifically, the wireless cellular communication network transceiver 201 may be configured to communicate with one or more cell sites which are in proximity to the wireless mobile communication device, such as with the cell site 104 and/or 105. The wireless cellular communication network transceiver 201 may be configured to communicate data and/or voice.

The Wi-Fi transceiver 203 may be configured to communicate with one more Wi-Fi access points which are in close proximity to the wireless mobile communication device, such as with the Wi-Fi access point 117 and/or 119. The Wi-Fi transceiver 203 may be configured to wirelessly communicate data and other information over the Internet 103.

The network load detection system 205 may be configured to detect load information indicative of an amount of load on the wireless communication network which is communicating with the wireless cellular communication network transceiver 201, such as load information indicative of an amount of load on a cell site with which the wireless communication network transceiver 201 is communicating. One or more of a variety of approaches may be used to facilitate this detection. Examples of these are described below.

The Wi-Fi transceiver controller 207 may be configured to autonomously power on the Wi-Fi transceiver 203 when the load information indicates that there is a heavy load on the cell site with which the wireless cellular communication network transceiver 201 is communicating. What is or is not a heavy load may be defined by one or more thresholds and/or algorithms within the Wi-Fi transceiver controller 207. In one aspect, a heavy load may be defined as any time the network is overloaded, for example when the number of devices accessing a particular system exceeds a threshold set to ensure adequate quality of service (QoS) to each device. Adequate QoS may be measured, for example, by meeting a predetermined signal-to-noise ratio (or some other parameter) for data signals to/from each device. The wireless mobile communication device 107 may determine whether a heavy load is present, e.g. by measuring the QoS parameter or by receiving from a network device a broadcast signifying the presence of a heavy load.

The Wi-Fi transceiver controller 207 may be configured to autonomously power down the Wi-Fi transceiver 203 when the load information no longer indicates that there is a heavy load on the cell site which is in communication with the wireless cellular communication network transceiver 201. The Wi-Fi transceiver controller 207 may be configured in addition or instead to autonomously power down the Wi-Fi transceiver when charge remaining in a battery which is supplying power to the wireless mobile communication device reaches a low threshold, such as when only 25% battery charge remains. The battery charge detection system 209 may be configured to detect the charge level in the battery.

Figures 3, 4:
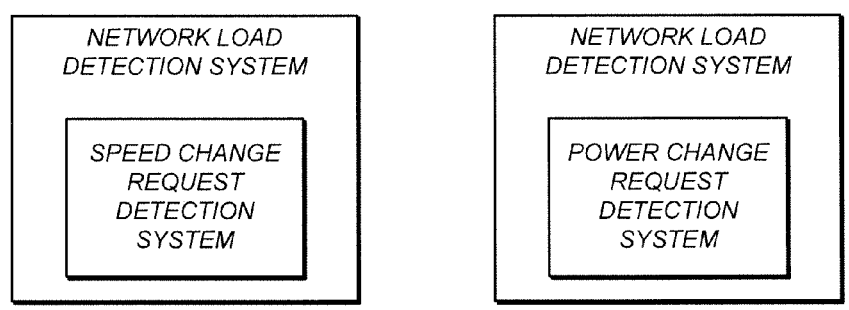
FIG. 3 illustrates an example of the network load detection system illustrated in FIG. 2 configured to detect a speed change request from the cellular communication network.
FIG. 4 illustrates an example of the network load detection system illustrated in FIG. 2 configured to detect a power change request from the cellular communication network.

FIG. 3 illustrates an example of the network load detection system 205 illustrated in FIG. 2 configured to detect a speed change request from the cellular communication network. The network load detection system illustrated in FIG. 3 may be used in wireless mobile communication devices which are different from than the one illustrated in FIG. 2. Similarly, the network load detection system 205 illustrated in FIG. 2 may be different from the one illustrated in FIG. 3.

The network load detection system 205 may include a speed change request detection system 301 which may be configured to detect when a speed change request signal is received from the wireless cellular communication network 101 by the wireless cellular communication network transceiver 201. The network load detection system 205 may interpret a request to lower the speed as load information indicating the presence of a heavy load on the wireless cellular communication network 101. The Wi-Fi transceiver controller 207 may be configured to autonomously power on the Wi-Fi transceiver 203 in response to receipt of this request to lower speed.

FIG. 4 illustrates an example of the network load detection system 205 illustrated in FIG. 2 configured to detect a power change request from the cellular communication network. The network load detection system illustrated in FIG. 4 may be used in wireless mobile communication devices which are different from the one illustrated in FIG. 2. Similarly, the network load detection system 205 illustrated in FIG. 2 may be different from the one illustrated in FIG. 4.

The network load detection system 205 may include a power change request detection system 401 which may be configured to detect when a power change request signal is received from the wireless cellular communication network 101 by the wireless cellular communication network transceiver 201. The network load detection system 205 may interpret a request to increase the power as load information indicating the presence of a heavy load on the wireless cellular communication network 101. The Wi-Fi transceiver controller 207 may be configured to autonomously power on the Wi-Fi transceiver 203 in response to receipt of this request to increase power. When the Wi-Fi transceiver 203 powers on, the device will connect to an open or previously connected Wi-Fi network. Once connected to a Wi-Fi network, the device automatically prioritizes the Wi-Fi connection over cellular for data, and the cellular connection becomes dormant or may be disconnected.

Figure 5:
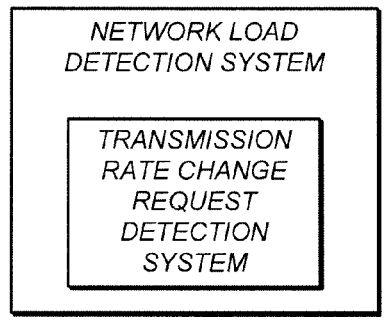
FIG. 5 illustrates an example of the network load detection system illustrated in FIG. 2 configured to detect a transmission rate change request from the cellular communication network.

FIG. 5 illustrates an example of the network load detection system 205 illustrated in FIG. 2 configured to detect a transmission rate change request from the cellular communication network. The network load detection system illustrated in FIG. 5 may be used in wireless mobile communication devices which are different from the one illustrated in FIG. 2. Similarly, the network load detection system 205 illustrated in FIG. 2 may be different from the one illustrated in FIG. 5.

The network load detection system 205 may include a transmission rate change request detection system 501 which may be configured to detect when a transmission rate change request signal is received from the wireless cellular communication network 101 by the wireless cellular communication network transceiver 201. The network load detection system 205 may interpret a request to decrease the transmission rate as load information indicating the presence of a heavy load on the wireless cellular communication network 101. The Wi-Fi transceiver controller 207 may be configured to autonomously power on the Wi-Fi transceiver 203 in response to receipt of this request to decrease the transmission rate.

Figure 6:
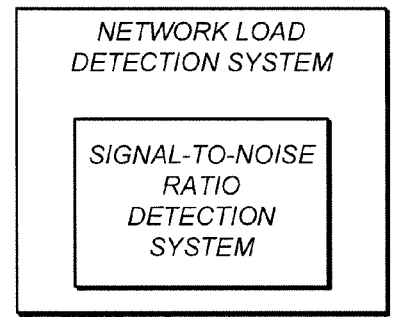
FIG. 6 illustrates an example of the network load detection system illustrated in FIG. 2 configured to detect the signal-to-noise ratio of a signal from the cellular communication network.

FIG. 6 illustrates an example of the network load detection system 205 illustrated in FIG. 2 configured to detect the signal-to-noise ratio of a signal from the cellular communication network. The network load detection system illustrated in FIG. 6 may be used in wireless mobile communication devices which are different from the one illustrated in FIG. 2. Similarly, the network load detection system 205 illustrated in FIG. 2 may be different from the one illustrated in FIG. 6.

The network load detection system 205 may include a signal-to-noise ration detection system 601 which may be configured to detect the signal-to-noise ratio of a signal which is received from the wireless cellular communication network 101 by the wireless cellular communication network transceiver 201. The network load detection system 205 may interpret a signal-to-noise ratio that fails to meet a threshold as load information as indicating the presence of a heavy load on the wireless cellular communication network 101. The Wi-Fi transceiver controller 207 may be configured to autonomously power on the Wi-Fi transceiver 203 in response to detection of a signal-to-noise ratio which fails to meet the threshold.

Figure 7:
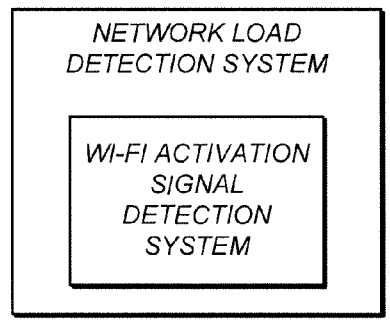
FIG. 7 illustrates an example of the network load detection system illustrated in FIG. 2 configured to detect an alternate transceiver activation signal from a dedicated channel in the cellular communication network.

FIG. 7 illustrates an example of the network load detection system 205 illustrated in FIG. 2 configured to detect an alternate transceiver activation signal from a channel in the cellular communication network. The network load detection system illustrated in FIG. 7 may be used in wireless mobile communication devices which are different from the one illustrated in FIG. 2. Similarly, the network load detection system 205 illustrated in FIG. 2 may be different from the one illustrated in FIG. 7.

The network load detection system 205 may include a Wi-Fi activation signal detection system 701 which may be configured to detect when a Wi-Fi activation signal is received on a channel in the wireless cellular communication network 101 which is dedicated to delivery of this signal when the load on the wireless cellular communication network 101 becomes heavy. This channel may be one which is not being used for any other purpose or may be one which is also used for another purpose. The network load detection system 205 may interpret the detection of the Wi-Fi activation signal as load information indicating the presence of a heavy load on the wireless cellular communication network 101. The Wi-Fi transceiver controller 207 may be configured to autonomously power on the Wi-Fi transceiver 203 in response to detection of the Wi-Fi activation signal.

The Wi-Fi activation signal detection system 701 may be configured to detect when a Wi-Fi deactivation signal is received on the dedicated channel from the cellular communication network 101 when the load on the wireless cellular communication network 101 is no longer heavy. The Wi-Fi transceiver controller 207 may be configured to autonomously power down the Wi-Fi transceiver 203 in response to detection of the Wi-Fi deactivation signal.

The network load detection system 205 may be configured to detect other information which indicates a heavy load on the wireless cellular communication network 101. The network load detection system 205 may be configured to examine a combination of different types of information which may indicate a heavy load on the wireless cellular communication network 101 in order to more accurately determine whether there is, in fact, such a heavy load. For example, a heavy load may be equated with a combination of a high duration of poor S/N ratio, consecutive repetitive increase in transmit power requests, and/or denial of requests for high data rate slots even though the system appears capable of support, etc. The wireless cellular communication network transceiver 201 which is illustrated in FIG. 2 may be configured to make the speed change request signal, the power change request signal, the transmission rate change request signal, the Wi-Fi activation signal, and/or the Wi-Fi deactivation signal which it receives from the wireless cellular communication network 101, as well as the signal-to-noise ratio of a signal from the wireless cellular communication network 101, available to the network load detection system 205 for analysis.

Figure 8:
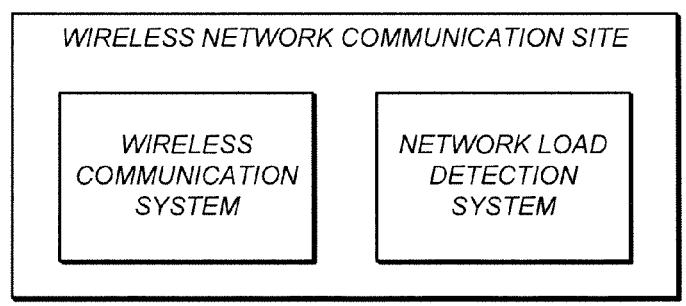
FIG. 8 illustrates an example of a wireless communication network site configured to issue a Wi-Fi activation signal when the load on the site becomes heavy.

FIG. 8 illustrates an example of a wireless communication network site 801 configured to issue a Wi-Fi activation signal when the load on the site becomes heavy. As illustrated in FIG. 8, the wireless communication network site 801 may include a wireless communication system 803 configured to wirelessly communicate with a plurality of wireless mobile communication devices, such as the cell phones 107, 113, and 115 and the laptop computers 109 and 111 illustrated in FIG. 1. The wireless communication network site 801 may include a network load detection system 805 configured to detect when the load on the wireless communication network site 801 becomes heavy. Upon a heavy load being detected by the network load detection system 805, the wireless communication system 803 may be configured to broadcast a Wi-Fi activation signal to each of the wireless mobile communication devices which are currently in communication with it on a common, standard traffic channel which may be dedicated to the delivery of such a Wi-Fi activation signal.

The network load detection system 805 may be configured to detect when the load on the wireless communication network site 801 is no longer heavy. Upon this happening, the wireless communication system 803 may be configured to broadcast a Wi-Fi deactivation signal to each of the wireless mobile communication devices which are currently in communication with it on the dedicated channel.

Unless otherwise indicated, the wireless mobile communication devices and wireless network communication sites which have been discussed herein may each be implemented with a computer system configured to perform the functions which have been described herein for the component. Each computer system may include one or more computers at the same or different locations. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

We claim:

1. A wireless mobile communication device comprising:
a first transceiver configured to wirelessly communicate with a first wireless communication network;
a second transceiver which is different from the first transceiver and which is configured to wirelessly communicate with a second wireless communication network which is different from the first wireless communication network;

a network load detection system configured to detect load information indicative of an amount of network traffic load on the first wireless communication network; and a second transceiver controller configured to autonomously power on, from a powered down state, the second transceiver to enable use of the second wireless network for data communication, when the load information indicates a heavy network traffic load on the first wireless communication network, wherein;

the load information includes one of:

a signal from the first wireless communication network directing the first transceiver to change to a slower speed communication channel;

a signal from the first wireless communication network directing the first transceiver to increase power of signal transmission;

a signal from the first wireless communication network directing the first transceiver to lower the rate of data transmission;

information indicative of a signal-to-noise ratio of a signal being received by the first transceiver from the first wireless communication network; and an alternate transceiver activation signal on a channel in the first wireless communication network which is dedicated to the delivery of this signal when the load on the first wireless communication network becomes heavy; and the second transceiver controller is configured to autonomously power on the second transceiver and, if available, use the second network to transmit data in response to receipt of the load information from the first wireless communication network.

2. The wireless mobile communication device of claim 1 wherein:

the first wireless communication network is a wireless cellular communication network which includes a plurality of wireless communication network sites;

the first transceiver is configured to wirelessly communicate with one of the wireless communication network sites;

the network load detection system is configured to detect load information indicative of an amount of load on the one wireless communication network site; and the second transceiver controller is configured to autonomously power on the second transceiver when the load information indicates a heavy load on the one wireless communication site.

3. The wireless mobile communication device of claim 1 wherein:

the second wireless communication network provides access to the Internet via a Wi-Fi access point;

the second transceiver is a Wi-Fi transceiver configured to wirelessly communicate with the Wi-Fi access point.

4. The wireless mobile communication device of claim 1 wherein:

the load information which is detected by the network load detection system includes a signal from the first wireless communication network directing the first transceiver to change to a slower speed communication channel; and the second transceiver controller is configured to autonomously power on the second transceiver and if available, use the second network to transmit data in response to receipt of the signal from the first wireless communication network directing the first transceiver to change to a slower speed communication channel.

5. The wireless mobile communication device of claim 1 wherein:

the load information which is detected by the network load detection system includes a signal from the first wireless communication network directing the first transceiver to increase power of signal transmission; and the second transceiver controller is configured to autonomously power on the second transceiver and if available, use the second network to transmit data in response to receipt of the signal from the first wireless communication network directing the first transceiver to increase the power of its signal transmission.

6. The wireless mobile communication device of claim 1 wherein:

the load information which is detected by the network load detection system includes a signal from the first wireless communication network directing the first transceiver to lower the rate of data transmission; and the second transceiver controller is configured to autonomously power on the second transceiver and if available, use the second network to transmit data in response to receipt of the signal from the first wireless communication network directing the first transceiver to lower the rate of data transmission.

7. The wireless mobile communication device of claim 1 wherein:

the load information which is detected by the network load detection system includes information indicative of a signal-to-noise ratio of a signal being received by the first transceiver from the first wireless communication network; and the second transceiver controller is configured to autonomously power on the second transceiver and if available, use the second network to transmit data in response to the signal-to-noise ratio not meeting a threshold.

8. The wireless mobile communication device of claim 1 wherein:

the load information which is detected by the network load detection system includes an alternate transceiver activation signal on a channel in the first wireless communication network which is dedicated to the delivery of this signal when the load on the first wireless communication network becomes heavy; and the second transceiver controller is configured to autonomously power on the second transceiver and if available, use the second network to transmit data in response to receipt of the alternate transceiver activation signal from the first wireless communication network.

9. The wireless mobile communication device of claim 1 wherein the second transceiver controller is configured to autonomously power down the second transceiver when the load information no longer indicates a heavy load on the first wireless communication network.

10. The wireless mobile communication device of claim 1 further comprising a battery configured to power the wireless mobile communication device, wherein the second transceiver controller is configured to autonomously power down the second transceiver when the charge remaining in the battery reaches a threshold.

11. Non-transitory, tangible, computer-readable media containing computer programming instructions configured to cause a wireless mobile communication device that is running the programming instructions and that has:

a first transceiver configured to wirelessly communicate with a first wireless communication network, and a second transceiver different from the first transceiver and configured to wirelessly communicate with a second wireless communication network different from the first wireless communication network,
to autonomously power on, from a powered down state, the second transceiver to enable use of the second wireless network for data communication, when load information indicates a heavy network traffic load on the first wireless communication network, wherein;
the load information includes one of:
  a signal from the first wireless communication network directing the first transceiver to change to a slower speed communication channel;
  a signal from the first wireless communication network directing the first transceiver to increase power of signal transmission;
  a signal from the first wireless communication network directing the first transceiver to lower the rate of data transmission;
  information indicative of a signal-to-noise ratio of a signal being received by the first transceiver from the first wireless communication network; and
  an alternate transceiver activation signal on a channel in the first wireless communication network which is dedicated to the delivery of this signal when the load on the first wireless communication network becomes heavy; and
the programming instructions are configured to cause the wireless mobile communication device which is running the programming instructions to autonomously power on the second transceiver and, if available, use the second network to transmit data in response to receipt of the load information from the first wireless communication network.

12. The computer-readable media of claim 11 wherein:
the first wireless communication network is a wireless cellular communication network which includes a plurality of wireless communication network sites;
the first transceiver is configured to wirelessly communicate with one of the wireless communication network sites; and
the programming instructions are configured to cause the wireless mobile communication device which is running the programming instructions to autonomously power on the second transceiver when the load information indicates a heavy load on the one wireless communication site.

13. The computer-readable media of claim 11 wherein:
the second wireless communication network includes provided access to Internet via a Wi-Fi access point; and
the second transceiver is a Wi-Fi transceiver configured to wirelessly communicate with the Wi-Fi access point.

14. The computer-readable media of claim 11 wherein:
the load information includes a signal from the first wireless communication network directing the first transceiver to change to a slower speed communication channel; and
the programming instructions are configured to cause the wireless mobile communication device which is running the programming instructions to autonomously power on the second transceiver and, if available, use the second network to transmit data in response to receipt of the signal from the first wireless communication network directing the first transceiver to change to a slower speed communication channel.

15. The computer-readable media of claim 11 wherein:
the load information includes a signal from the first wireless communication network directing the first transceiver to increase a power of signal transmission; and
the programming instructions are configured to cause the wireless mobile communication device which is running the programming instructions to autonomously power on the second transceiver and, if available, use the second network to transmit data in response to receipt of the signal from the first wireless communication network directing the first transceiver to increase the power of its signal transmission.

16. The computer-readable media of claim 11 wherein:
the load information includes information indicative of a signal-to-noise ratio of a signal being received by the first transceiver from the first wireless communication network; and
the programming instructions are configured to cause the wireless mobile communication device which is running the programming instructions to autonomously power on the second transceiver and, if available, use the second network to transmit data in response to the signal-to-noise ratio not meeting a threshold.

17. The computer-readable media of claim 11 wherein:
the load information includes a signal from the first wireless communication network directing the first transceiver to change a rate of data transmission; and
the programming instructions are configured to cause the wireless mobile communication device which is running the programming instructions to autonomously power on the second transceiver and, if available, use the second network to transmit data in response to receipt of the signal from the first wireless communication network directing the first transceiver to change a rate of data transmission.

18. The computer-readable media of claim 11 wherein:
the load information includes a second transceiver activation signal on a channel in the first wireless communication network which is dedicated to the delivery of this signal when the load on the first wireless communication network becomes heavy; and
the programming instructions are configured to cause the wireless mobile communication device which is running the programming instructions to autonomously power on the second transceiver and, if available, use the second network to transmit data in response to receipt of the second transceiver activation signal from the first wireless communication network.

19. The computer-readable media of claim 11 wherein the programming instructions are configured to cause the wireless mobile communication device which is running the programming instructions to autonomously power down the second transceiver when the load information no longer indicates a heavy load on the first wireless communication network.

20. The computer-readable media of claim 11 wherein:
the mobile communication device has a battery configured to power the wireless mobile communication device; and
the programming instructions are configured to cause the wireless mobile communication device which is running the programming instructions to autonomously power down the second transceiver when the charge remaining in the battery reaches a threshold.

21. A wireless cellular communication network comprising a plurality of wireless communication network sites, each configured to:
  wirelessly communicate with a plurality of wireless mobile communication devices; and
  broadcast to each of the wireless mobile communication devices a Wi-Fi activation signal on a common channel dedicated to the delivery of this signal which directs each of the wireless mobile communication devices to autonomously power their Wi-Fi transceivers from off to on when network traffic load on the wireless communication network site becomes heavy; and broadcast to each of the wireless mobile communication devices a signal on the common channel which directs each of the wireless mobile communication devices to autonomously power-off their Wi-Fi transceivers when the load on the wireless communication network site is no longer heavy.

* * * * *